United States Patent
Niimi et al.

(10) Patent No.: US 6,880,514 B2
(45) Date of Patent: Apr. 19, 2005

(54) OIL RECEIVER

(75) Inventors: Atsushi Niimi, Saitama (JP); Takashi Sasaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/322,448

(22) Filed: Dec. 19, 2002

(65) Prior Publication Data

US 2003/0154949 A1 Aug. 21, 2003

(30) Foreign Application Priority Data

Dec. 28, 2001 (JP) .................................. 2001-399538

(51) Int. Cl.⁷ .............................................. F01M 1/06
(52) U.S. Cl. ................................ 123/196 R; 123/196 S
(58) Field of Search ...................... 123/196 R, 196 M

(56) References Cited

U.S. PATENT DOCUMENTS

| | | | |
|---|---|---|---|
| 4,476,836 A | * 10/1984 | Enomoto et al. ............ 123/502 |
| 4,622,933 A | * 11/1986 | Fukuo et al. ............ 123/196 R |
| 5,186,608 A | 2/1993 | Bagge | |
| 5,364,231 A | 11/1994 | Eick et al. | |
| 5,493,952 A | * 2/1996 | Daniel et al. ................. 92/72 |
| 5,524,581 A | * 6/1996 | Rush et al. ............. 123/90.34 |
| 5,897,293 A | 4/1999 | Arel et al. | |
| 6,202,620 B1 | * 3/2001 | Yamaguchi ............. 123/196 R |
| 6,332,443 B1 | * 12/2001 | Kaita ..................... 123/196 R |
| 6,475,046 B1 | * 11/2002 | Muramatsu et al. ...... 440/88 R |
| 6,481,389 B1 | * 11/2002 | Suzuki et al. ............ 123/41.35 |

FOREIGN PATENT DOCUMENTS

GB 551 918 A 3/1943

* cited by examiner

*Primary Examiner*—Noah P. Kamen
*Assistant Examiner*—Jason Benton
(74) *Attorney, Agent, or Firm*—Birch Stewart Kolasch & Birch, LLP

(57) ABSTRACT

To provide an oil receiver in which friction on a shaft body generated in association with introduction of hydraulic pressure into the oil receiver is alleviated. Therefore, the amount of fuel consumption is reduced and durability is improved. Furthermore, the number of components is reduced, and thus manufacturing and assembly costs can be reduced. An oil receiver includes a connecting oil passage in communication with an inside of the shaft body via a communication hole formed in the shaft body. A lead-in oil passage for introducing lubricating oil into the connecting oil passage extends from the connecting oil passage radially outward. A balance oil passage extends from the connecting oil passage radially outward on an opposite side of the connecting oil passage from the lead-in oil passage. The balance oil passage is closed at an extremity thereof. Accordingly, lubricating oil can be introduced from the lead-in oil passage into the inside of the shaft body.

32 Claims, 5 Drawing Sheets

OIL RECEIVER

CROSS-REFERENCE TO RELATED APPLICATIONS

This nonprovisional application claims priority under 35 U.S.C. § 119(a) on patent application Nos. 2001-399538, filed in Japan on Dec. 28, 2001, the entirety of which is hereby incorporated by reference.

BACKGROUND OF THE INVENTION

1. Field of the Invention

The present invention relates to an oil receiver for introducing lubricating oil into a shaft body from the outside.

2. Description of Background Art

When introducing lubricating oil into a shaft body from the outside, an oil receiver is provided for supplying lubricating oil. The oil receiver includes a connecting oil passage formed on the outer periphery of the shaft body which communicates with a communication hole extending from the inside to the outside of the shaft body.

For example, in the case of an aircraft, hydraulic pressure for varying the pitch of the propeller is supplied through an oil passage located inside the revolving shaft of the propeller. An oil receiver is formed around the outer periphery of the revolving shaft of the propeller for introducing lubricating oil from an external hydraulic pressure varying unit into the oil passage inside the revolving shaft of the propeller.

The construction of an oil receiver according to the background art is illustrated in FIGS. 6 and 7 of the present invention.

Referring to FIGS. 6 and 7, the crankshaft 03 of the internal combustion engine directly rotates a propeller. The crankshaft 03 is rotatably supported by the cylinder block 01 of the internal combustion engine via a bearing 02. The crankshaft 03 is cylindrical in shape and is fitted therein with an inner cylinder 04. The clearance between the crankshaft 03 and the inner cylinder 04 is used as the oil passage 05.

The communication holes 06 open at positions upstream of the oil passage 05 and are formed, for example, at every 180° circumferentially of the crankshaft 03. An oil receiver 07 is mounted so as to cover the plurality of communication holes 06 on the outer periphery of the crankshaft 03.

The oil receiver 07 forms an annular oil passage 08 along the outer peripheral surface of the crankshaft 03. The aforementioned two communication holes 06 communicate with the annular oil passage 08.

A lead-in oil passage 09 extends integrally from a part of the annular oil passage 08 radially outward. An extremity of the lead-in oil passage 09 is fitted and connected in a joint pipe 01a, which projects from the inner surface of the cylinder block 01 in a liquid-tight manner.

Lubricating oil supplied from the hydraulic pressure varying unit is introduced into the annular oil passage 08 from the joint pipe 01a through the lead-in oil passage 09. The lubricating oil then flows into the oil passage 05 in the crankshaft 03 through the communication holes 06, and reaches the propeller pitch varying unit at the propeller boss at the extremity of the crankshaft. Accordingly, the pitch of the propeller can be varied.

The oil receiver 07 is fixed in contrast to the rotating crankshaft 03 and is in sliding contact with the crankshaft 03. Furthermore, the oil receiver 07 is formed with a stopper 07a, which is to be locked by a part of the cylinder block 01 for preventing the oil receiver 07 from rotating together with the crankshaft 03.

The oil receiver 07 is divided into two halves and includes a left half and the right half. The respective oil receiver halves 07L, 07R clamp the crankshaft 03 from the left and the right. The fastening bosses on the top and bottom are fastened with bolts 010, 011. The lead-in oil passage 09 is formed integrally on the right oil receiver half 07R (left side in FIG. 7).

The hydraulic pressure introduced into the lead-in oil passage 09 of the oil receiver 07 is introduced from the joint pipe 01a. Accordingly, the hydraulic pressure in the joint pipe 01a is applied on the end surface of the opening of the lead-in oil passage 09. This pressure P constantly presses the right oil receiver half 07R leftward (rightward in FIG. 7), which increases friction with respect to the crankshaft 03, which is in sliding contact therewith. As a consequence, the amount of consumption of fuel may increase and the progression of abrasion may be accelerated.

The oil receiver 07 is prevented from being rotated together with the rotation of the crankshaft 03 by the lead-in oil passage 09 fitted into the joint pipe 01a of the cylinder block 01. However, this is an insufficient way to prevent rotation of the oil receiver 07. Accordingly, the stopper 07a is also separately locked by a part of the cylinder block.

The lead-in oil passage 09 is formed integrally on the right oil receiver half 07R, and the stopper 07a is formed integrally on the left oil receiver half 07L. Therefore, the left and right oil receiver halves 07L, 07R are not symmetrical, and hence are not identical in shape. As a consequence, two types of oil receiver halves must be provided.

SUMMARY OF THE INVENTION

In view of the above, it is an object of the present invention to provide an oil receiver in which friction with respect to the shaft body generated in association with introduction of the hydraulic pressure into the oil receiver is alleviated. Therefore, the amount of fuel consumption can be reduced and durability can be improved. Furthermore, it is an object of the present invention to reduce the number of necessary components to reduce manufacturing and assembly costs.

In order to achieve the aforementioned object, according to a first aspect of the present invention, an oil receiver includes a connecting oil passage in communication with an inside of a shaft body via a communication hole formed on an outer periphery of the shaft body. A lead-in oil passage is provided for introducing lubricating oil into the aforementioned connecting oil passage. The lead-in oil passage extends from the connecting oil passage radially outward. Lubricating oil is introduced from the lead-in oil passage into the inside of the shaft body. A balance oil passage extends integrally from the connecting oil passage radially outward on an opposite side thereof, symmetrically with the lead-in oil passage. The balance oil passage is closed at an extremity thereof.

The balance oil passage, which has a closed extremity, is provided symmetrically with the lead-in oil passage. Accordingly, the pressure of the pressurized oil applied on the end surface of the opening of the lead-in oil passage and the pressure applied on the end surface of the opening at the extremity of the balance oil passage are the same. Accordingly, the pressures are cancelled out, and thus the oil receiver is balanced at a center thereof As a consequence, friction with respect to the shaft body is alleviated, the amount of fuel consumption is reduced, the progression of abrasion can be prevented, and durability can be improved.

According to a second aspect of the present invention, the oil receiver is adapted to be divided into two halves along a symmetry plane of the lead-in oil passage and the balance oil passage that are axially symmetrical. Furthermore, the divided oil receiver halves are identical in shape.

Since the divided oil receiver halves are identical in shape, the number of different components is reduced. Therefore, a reduction in manufacturing and assembly costs can be achieved.

According to a third aspect of the present invention, the extremity of the lead-in oil passage and the extremity of the balance oil passage are fitted into the symmetrical joint pipes on the fixed support in a liquid-tight manner. Furthermore, the joint pipe, in which the extremity of the balance oil passage is fitted, is closed.

The extremities of the lead-in oil passage and the balance oil passage are fitted in the symmetrical joint pipes on the fixed support in a liquid-tight manner respectively. Accordingly, the movement of the oil receiver in association with the movement of the shaft body may easily be prevented without providing a stopper even when the shaft body rotates with respect to the fixed support. In addition, since it is not a cantilevered type as in the background art, local abutment of the oil receiver due to leaning of the oil receiver can be prevented even when the shaft body is slid in the axial direction.

According to a fourth aspect of the present invention, the shaft body is a crankshaft of an internal combustion engine for an aircraft. A hydraulic pressure varying unit is provided upstream of the aforementioned lead-in oil passage. Furthermore, a propeller pitch varying unit for varying the pitch of the propeller by hydraulic pressure is provided downstream of the oil passage formed in the crankshaft in the direction of the axis of the communication hole.

In an aircraft, the crankshaft of the internal combustion engine is adapted to rotate the propeller directly. Therefore, the hydraulic pressure of the hydraulic pressure varying unit is introduced from the lead-in oil passage into the connecting oil passage of the oil receiver, and then fed through the communication hole into the oil passage in the rotating crankshaft. The hydraulic pressure acts on the propeller pitch varying unit located downstream thereof to vary the pitch of the propeller.

The extremities of the lead-in oil passage and the balance oil passage are fitted into the symmetrical joint pipes on the fixed support in a liquid-tight manner, even when the shaft body is a rotating shaft such as a crankshaft. Accordingly, the oil receiver can easily be prevented from being rotated in association with the rotation of the crankshaft without providing a stopper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to FIGS. 1 to 4, an embodiment of the present invention will be described. The oil receiver according to the present embodiment is applied to the crankshaft 12 of the internal combustion engine 10 of the aircraft 1. The oil receiver corresponds to a part of the oil passage for lubricating oil used for varying the pitch of a propeller 4.

Figure 1:
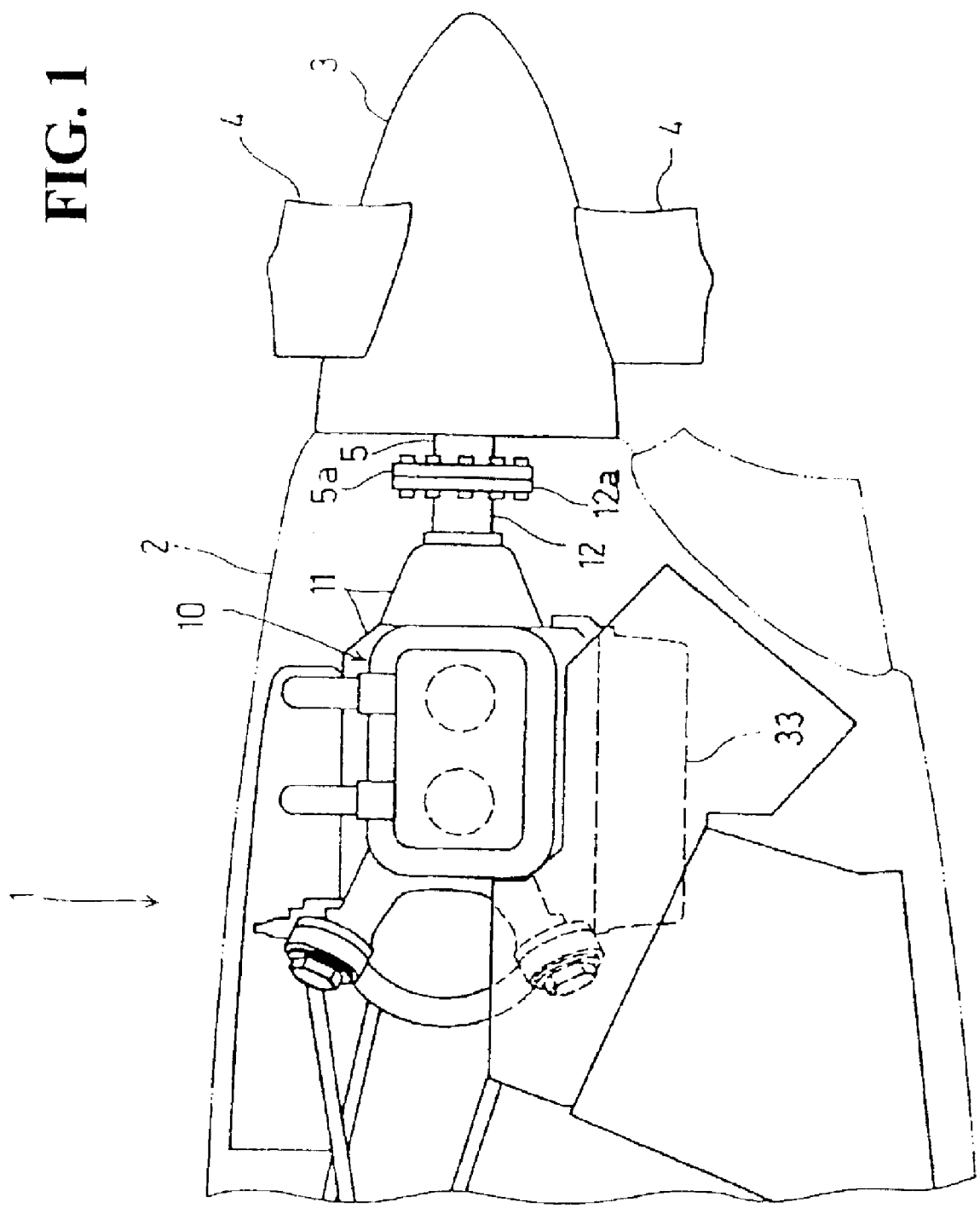
FIG. 1 is a schematic drawing of a drive section of a propeller for an aircraft according to an embodiment of the present invention.

General construction of the drive section of the propeller 4 for an aircraft 1 is shown in FIG. 1. A propeller boss 3 projects from the front end of the engine compartment 2 of the aircraft 1. A plurality of propellers 4 project in the radial direction from the propeller boss 3 so as to be capable of varying the propeller pitch (blade angle) as is known in the art.

A horizontally opposed 4-cylinder internal combustion engine 10 is mounted in the engine case 2. The crankshaft 12 projects forward from the cylinder block 11 and is coaxially connected to the propeller shaft 5 of the propeller boss 3 by fastening the flanges 12a, 5a with each other with bolts.

Figure 2:
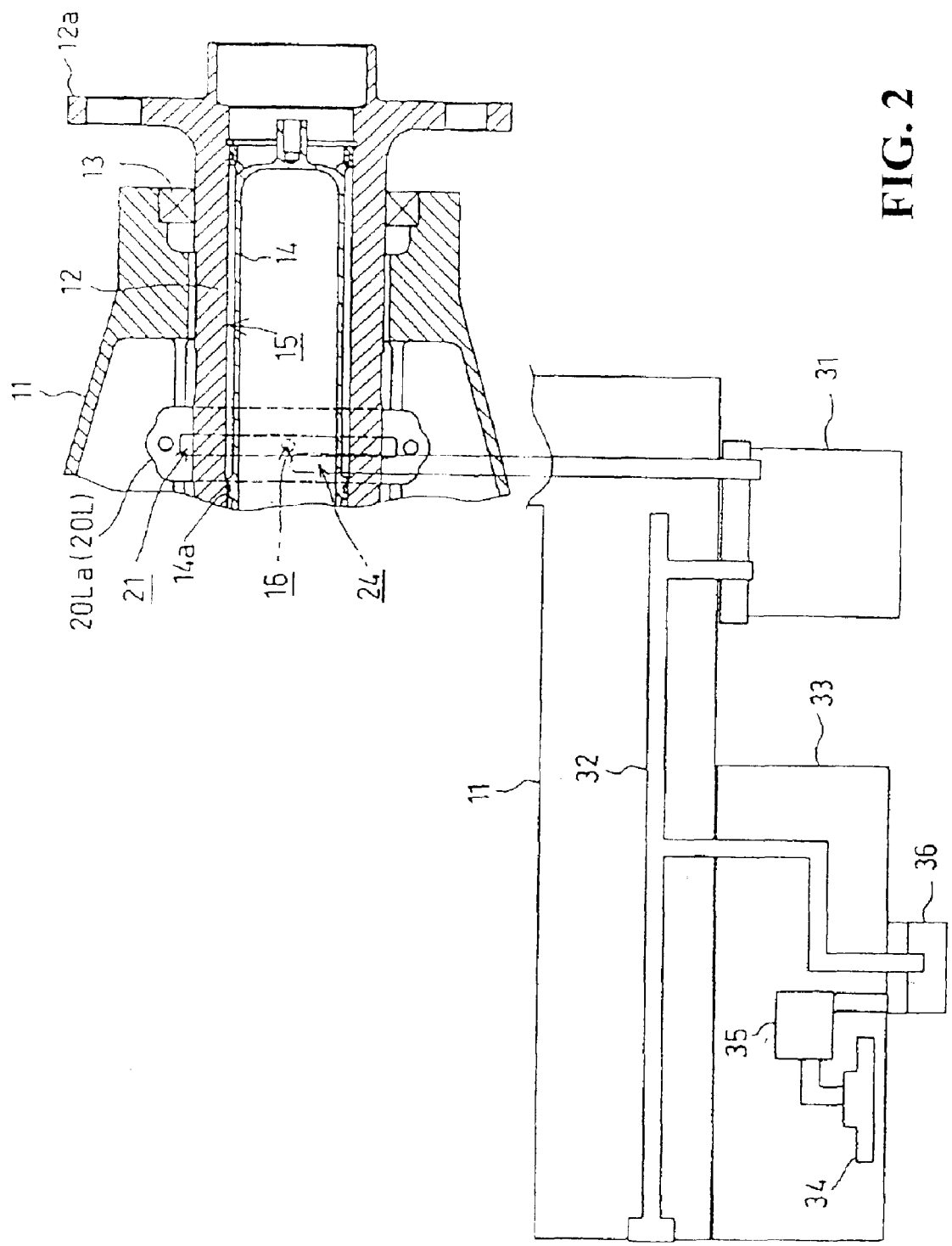
FIG. 2 shows a cross sectional view of a crankshaft in the vicinity of a front end portion taken along a vertical line, and a schematic view of an oil passage for lubricating oil.
Figure 3:
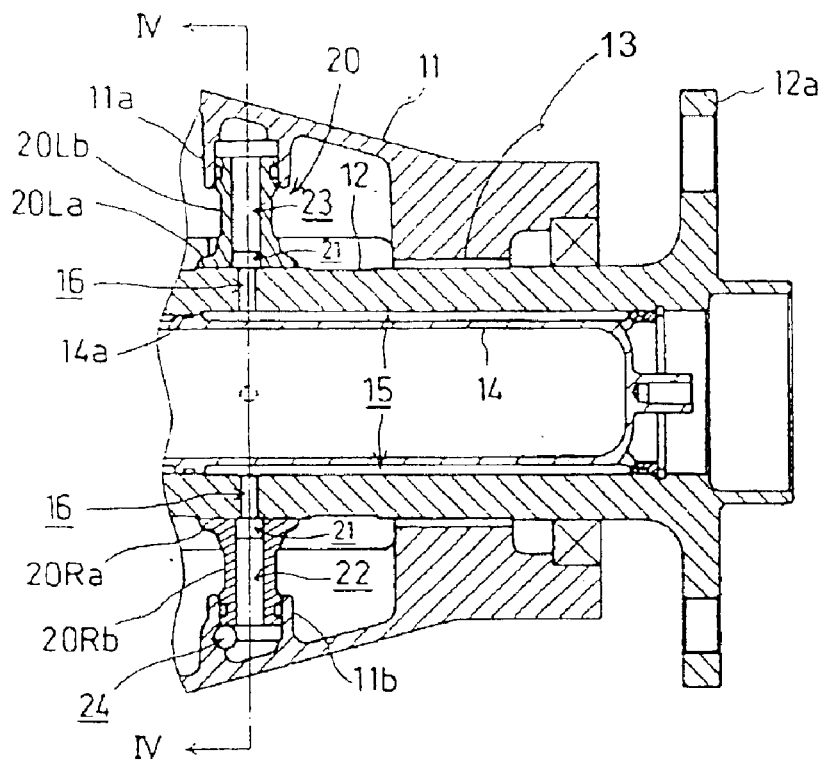
FIG. 3 is a cross sectional view of a crankshaft in the vicinity of a front end portion taken along a horizontal line.
Figure 4:
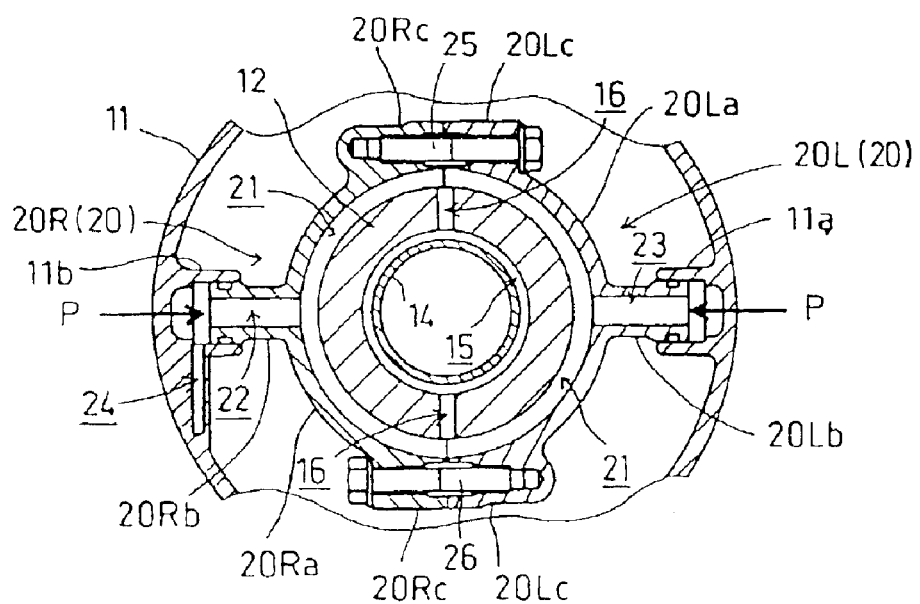
FIG. 4 is a cross sectional view taken along the line IV—IV in FIG. 3.

The construction of the crankshaft 12 in the vicinity of the front end portion will be shown in FIGS. 2 to 4. FIG. 2 shows a cross sectional view of the crankshaft 12 in the vicinity of the front end portion taken along a vertical line, and a schematic view of the oil passage for lubricating oil. FIG. 3 is a cross sectional view of the crankshaft 12 in the vicinity of the front end portion taken along a horizontal line.

The crankshaft 12 is rotatably supported by the cylinder block 11 via the bearing 13. The crankshaft 12 projects forward from a forward swelled out portion, and is provided with a flange 12a at the front portion. The crankshaft 12 is cylindrical and is fitted with an inner cylinder 14 therein. The clearance formed between the crankshaft 12 and the inner cylinder 14 is used as an oil passage 15.

A part of the rear portion of the inner cylinder 14 is broadened to form a sealing portion 14a. Lubricating oil is fed forward through the oil passage 15. Communication holes 16 open at positions upstream (near the sealing portion 14a) of the oil passage 15. The communication holes 16 are formed in crankshaft 12 at symmetrical positions at an angle of 180° in the circumferential direction (three or more communication holes 16 may be formed). An oil receiver 20 is mounted on the outer periphery of the crankshaft 12 so as to cover the plurality of communication holes 16.

The oil receiver 20 is formed by combining the left and right oil receiver halves 20L, 20R, clamping the crankshaft 12 therebetween. The left and right oil receiver halves 20L, 20R are identical in shape and include semi-circular portions 20La, 20Ra, straight tubes 20Lb, 20Rb projecting radially outwardly from the center of the respective semi-circular portions 20La, 20Ra, and fastening bosses 20Lc, 20Rc formed at both ends of the respective semi-circular portions 20La, 20Ra.

The left and right oil receiver halves 20L, 20R are combined by abutting the mating surfaces of the upper and lower fastening bosses 20Lc, 20Rc with each other in such a manner that the crankshaft 12 is clamped by the semi-circular portions 20La, 20Ra from the left and the right. The fastening bosses 20Lc, 20Rc are then fastened together with bolts 25, 26.

The semi-circular portions 20La, 20Ra and the crankshaft 12 are in contact with each other so as to be capable of rotating with respect to each other. A groove formed circumferentially along the inner peripheral surface of the semi-circular portions 20La, 20Ra forms an annular oil passage 21 with the outer peripheral surface of the crankshaft 12. This annular oil passage 21 corresponds to the connecting oil passage, and communicates with the aforementioned communication hole 16 formed in the crankshaft 12.

The straight tube 20Rb of the right (left in FIG. 4) oil receiver half 20R constitutes a lead-in oil passage 22 and communicates with the annular oil passage 21. The straight tube 20Lb of the left oil receiver half 20L constitutes the balance oil passage 23 and communicates with the annular oil passage 21.

On the inner peripheral surface of the cylinder block 11, joint pipes 11a, 11b project toward the straight tubes 20Lb, 20Rb projecting from the oil receiver 20 toward the left and right. The inner diameters of the joint pipes 11a, 11b are identical with the outer diameters of the opening ends of the extremities of the straight tubes 20Lb, 20Rb. Therefore, the straight tubes 20Lb, 20Rb may be fitted and joined into the joint pipes 11a, 11b via the seal member in a liquid-tight manner.

The joint pipe 11b to which the straight tube 20Rb that constitutes the lead-in oil passage 22 is fitted is in communication with the oil feed path 24. The joint pipe 11a to which the straight tube 20Lb that constitutes the balance oil passage 23 is fitted is closed.

Therefore, the hydraulic pressure supplied from the oil feed path 24 into the joint pipe 11b is introduced into the annular oil passage 21 of the oil receiver 20 through the lead-in oil passage 22. The hydraulic pressure is then introduced from the annular oil passage 21 into the oil passage 15 in the crankshaft 12 via the communication hole 16, fed along the oil passage 15 forward in the crankshaft 12, and then forward in the propeller shaft 5 to act on the propeller pitch varying unit in the propeller boss 3.

Provided upstream of the oil feed path 24 that feeds the hydraulic pressure to the oil receiver 20 is, as schematically shown in FIG. 2, a propeller governor 31 that corresponds to a hydraulic pressure varying unit. The propeller governor 31 is supplied with lubricating oil from the main gallery 32 formed in the cylinder block 11.

The oil pan 33 is disposed downwardly of the cylinder block 11. Lubricating oil tapped in the oil pan 33 is adsorbed by the oil pump 35 through the strainer 34. The lubricating oil discharged from the oil pump 35 is supplied to the aforementioned main gallery 32 via the oil filter cartridge 36.

When the propeller governor 31 is set in a predetermined state by the operation of the propeller pitch lever, not shown, it adjusts the hydraulic pressure automatically for allowing it to act upon the propeller pitch varying unit in the propeller boss 3 via the oil receiver 20 to vary the pitch of the propeller. The propeller governor 31 then automatically controls the revolution of the internal combustion engine to be at a predetermined constant revolution.

In the route of lubricating oil for varying the propeller pitch, the oil receiver 20 includes the balance oil passage 23 provided symmetrical to the lead-in oil passage 22. The balance oil passage 23 is closed at an extremity thereof as shown in FIG. 4. Therefore, the pressure P applied on the end surface of the opening of the lead-in oil passage 22 for the pressurized oil and the pressure P' applied on the end surface of the opening at the extremity of the balance oil passage 23 are the same in a direction toward each other. Therefore, these pressures are canceled out at the mating surfaces between the left and right oil receiver halves 20L, 20R, and thus the oil receiver 20 may be positioned at the well balanced center.

Therefore, friction generated between the oil receiver 20 and the crankshaft 12 is alleviated, and the amount of fuel consumption is reduce, thereby preventing the progression of abrasion and improving durability.

Since the divided oil receiver halves 20L, 20R are identical in shape, the number of components may be reduced and thus the costs may be reduced.

The respective extremities of the straight tubes 20Lb, 20Rb projecting from the oil receiver halves 20L, 20R to be combined toward the left and the right are fitted into the joint pipes 11a, 11b formed symmetrically on the cylinder block 11 in a liquid-tight manner. Accordingly, the oil receiver 20 can be easily prevented from being rotated in association with the rotation of the crankshaft 12 without providing a separate stopper.

Figure 5:
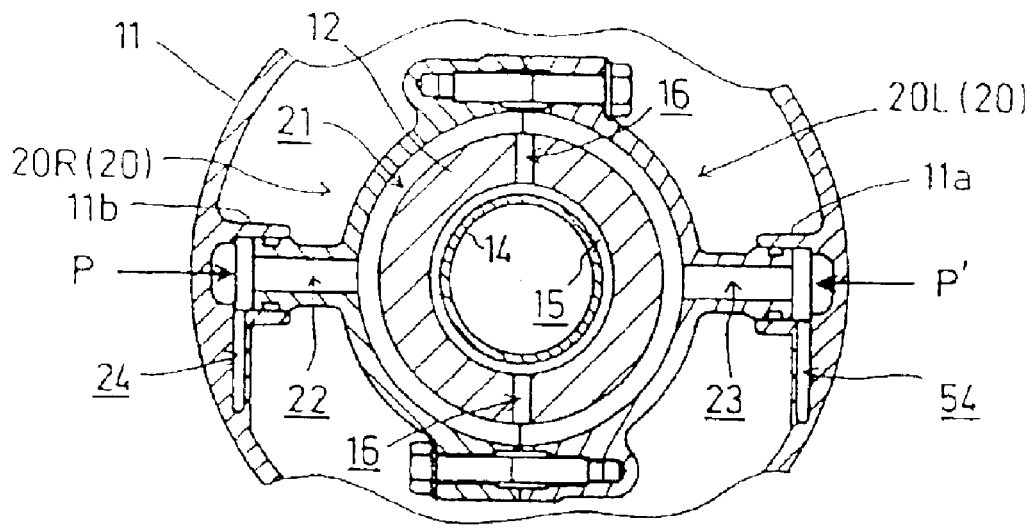
FIG. 5 is a cross sectional view showing another example of the present invention.
Figure 6:
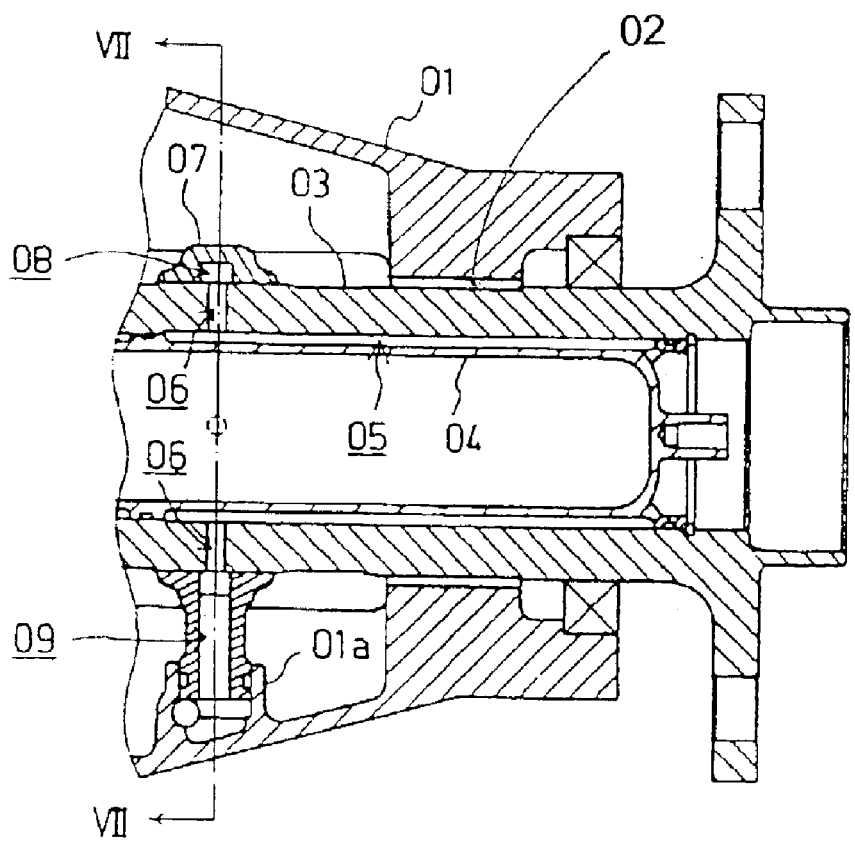
FIG. 6 is a cross sectional view of a crankshaft of the background art in the vicinity of a front end portion thereof taken along a horizontal line.
Figure 7:
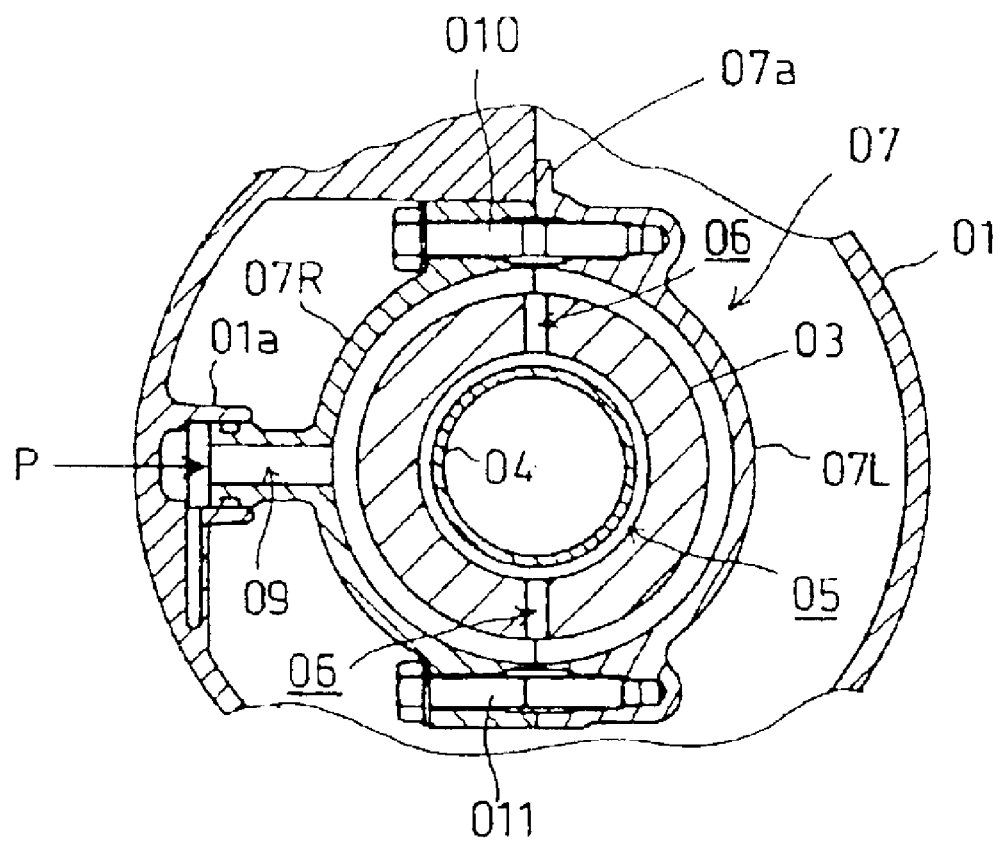
FIG. 7 is a cross sectional view taken along the line VII—VII in FIG. 6.

In the embodiment described thus far, pressurized oil is introduced from the lead-in oil passage 22 through the oil feed path 24. It is also possible to also provide an oil feed path 54 on the balance oil passage 23 so as to be symmetrical to the oil feed path 24 as shown in FIG. 5. Hydraulic pressure is also supplied from the propeller governor 31 to the oil feed path 54.

Forming the oil passage from the propeller governor 31 through both oil feed paths 24, 54 to the lead-in oil passage 22 and the balance oil passage 23 completely symmetrical with each other allows simultaneous supply of the same hydraulic pressure to the lead-in oil passage 22 and to the balance oil passage 23. Therefore, the oil receiver 20 can be constantly positioned at the well balanced center, thereby reducing friction generated between the oil receiver 20 and the crankshaft 12.

When feeding of lubricating oil to the oil receiver 20 is begun at the time of starting the internal combustion engine, the identical hydraulic pressure is simultaneously supplied to the lead-in oil passage 22 and to the balance oil passage 23. Therefore, the oil receiver 20 can be positioned at the well balanced center at startup and at the moment immediately after the engine is started.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil receiver comprising:
   an annular connecting oil passage, said annular connecting oil passage being mountable in communication with an inside of a shaft body via a communication hole formed in the shaft body;

a lead-in oil passage for introducing lubricating oil into said annular connecting oil passage, said lead-in oil passage extending from said annular connecting oil passage radially outward; and a balance oil passage, said balance oil passage extending from said annular connecting oil passage radially symmetrically outward on a side of said annular connecting oil passage opposite to said lead-in oil passage, wherein lubricating oil is capable of being introduced from said lead-in oil passage into the inside of the shaft body.

2. The oil receiver according to claim 1, wherein said oil receiver includes two halves divided along a symmetry plane between said lead-in oil passage and said balance oil passage, said lead-in oil passage and said balance oil passage being axially symmetrical, and said divided oil receiver halves are identical in shape.

3. The oil receiver according to claim 1, wherein an extremity of said lead-in oil passage and an extremity of said balance oil passage are receivable into symmetrical joint pipes on a fixed support in a liquid-tight manner, and the joint pipe for receiving said balance oil passage is closed.

4. The oil receiver according to claim 2, wherein an extremity of said lead-in oil passage and an extremity of said balance oil passage are receivable into symmetrical joint pipes on a fixed support in a liquid-tight manner, and the joint pipe for receiving said balance oil passage is closed.

5. The oil receiver according to claim 3, wherein the shaft body is a crankshaft of an internal combustion engine for an aircraft, a hydraulic pressure varying unit is mountable upstream of said lead-in oil passage, and a propeller pitch varying unit for varying the pitch of a propeller by hydraulic pressure is mountable downstream of an oil passage formed in the crankshaft.

6. The oil receiver according to claim 4, wherein the shaft body is a crankshaft of an internal combustion engine for an aircraft, a hydraulic pressure varying unit is mountable upstream of said lead-in oil passage, and a propeller pitch varying unit for varying the pitch of a propeller by hydraulic pressure is mountable downstream of an oil passage formed in the crankshaft.

7. The oil receiver according to claim 1, wherein said balance oil passage is closed at an extremity thereof.

8. The oil receiver according to claim 2, wherein said balance oil passage is closed at an extremity thereof.

9. The oil receiver according to claim 1, wherein said balance oil passage is open at an extremity thereof.

10. The oil receiver according to claim 2, wherein said balance oil passage is open at an extremity thereof.

11. A lubrication system for an internal combustion engine, comprising:

an engine block, said engine block including an oil feed path formed therein;

a shaft body, said shaft body including an oil passage extending axially therethrough and a communication hole extending from said oil passage to an outer periphery of said shaft body; and an oil receiver, said oil receiver for supplying oil from said oil feed path in said engine block to said oil passage in said shaft body, said oil receiver comprising:

an annular connecting oil passage; said annular connecting oil passage being mountable in communication with said communication hole;

a lead-in oil passage for introducing lubricating oil into said annular connecting oil passage, said lead-in oil passage extending from said annular connecting oil passage radially outward into communication with said oil feed path in said engine block; and a balance oil passage, said balance oil passage extending from said annular connecting oil passage radially symmetrically outward on a side of said annular connecting oil passage opposite to said lead-in oil passage.

12. The lubrication system according to claim 11, wherein said oil receiver includes two halves divided along a symmetry plane between said lead-in oil passage and said balance oil passage, said lead-in oil passage and said balance oil passage being axially symmetrical, and said divided oil receiver halves are identical in shape.

13. The lubrication system according to claim 11, wherein an extremity of said lead-in oil passage and an extremity of said balance oil passage are receivable into symmetrical joint pipes on said engine block in a liquid-tight manner, and said joint pipe for receiving said balance oil passage is closed.

14. The lubrication system according to claim 12, wherein an extremity of said lead-in oil passage and an extremity of said balance oil passage are receivable into symmetrical joint pipes on said engine block in a liquid-tight manner, and said joint pipe for receiving said balance oil passage is closed.

15. The lubrication system according to claim 13, wherein said shaft body is a crankshaft of an internal combustion engine for an aircraft, a hydraulic pressure varying unit is mountable upstream of said lead-in oil passage, and a propeller pitch varying unit for varying the pitch of a propeller by hydraulic pressure is mountable downstream of an oil passage formed in said crankshaft.

16. The lubrication system according to claim 14, wherein said shaft body is a crankshaft of an internal combustion engine for an aircraft, a hydraulic pressure varying unit is mountable upstream of said lead-in oil passage, and a propeller pitch varying unit for varying the pitch of a propeller by hydraulic pressure is mountable downstream of an oil passage formed in said crankshaft.

17. The lubrication system according to claim 11, wherein said balance oil passage is closed at an extremity thereof.

18. The lubrication system according to claim 12, wherein said balance oil passage is closed at an extremity thereof.

19. The lubrication system according to claim 11, wherein said balance oil passage is open at an extremity thereof.

20. The lubrication system according to claim 12, wherein said balance oil passage is open at an extremity thereof.

21. The oil receiver according to claim 1, wherein said annular connecting oil passage, said lead-in oil passage and said balance oil passage are formed in the same member.

22. The oil receiver according to claim 1, wherein said oil receiver includes a body and said annular connecting oil passage, said lead-in oil passage and said balance oil passage are formed in said body.

23. The oil receiver according to claim 1, wherein said lead-in oil passage and said balance oil passage are in direct communication with said annular connecting oil passage.

24. The oil receiver according to claim 1, wherein said oil receiver is mountable in said engine block such that said oil receiver floats within said engine block.

25. The lubrication system according to claim 11, wherein said annular connecting oil passage, said lead-in oil passage and said balance oil passage are formed in the same member.

26. The lubrication system according to claim 11, wherein said oil receiver includes a body and said annular connecting oil passage, said lead-in oil passage and said balance oil passage are formed in said body.

27. The lubrication system according to claim 11, wherein said lead-in oil passage and said balance oil passage are in direct communication with said annular connecting oil passage.

28. The lubrication system according to claim 11, wherein said oil receiver is mounted in said engine block such that said oil receiver floats within said engine block.

29. The lubrication system according to claim 11, wherein said shaft body includes an inner cylinder therein, said oil passage being formed between said inner cylinder and an inner surface of said shaft body.

30. An oil receiver comprising:
- a connecting oil passage, said connecting oil passage being mountable in communication with an inside of a shaft body via a communication hole formed in the shaft body;
- a lead-in oil passage for introducing lubricating oil into said connecting oil passage, said lead-in oil passage extending from said connecting oil passage radially outward; and
- a balance oil passage, said balance oil passage extending from said connecting oil passage radially symmetrically outward on a side of said connecting oil passage opposite to said lead-in oil passage,
- wherein lubricating oil is capable of being introduced from said lead-in oil passage into the inside of the shaft body, and wherein an extremity of said lead-in oil passage and an extremity of said balance oil passage are receivable into symmetrical joint pipes on a fixed support in a liquid-tight manner, and the joint pipe for receiving said balance oil passage is closed.

31. The oil receiver according to claim 29, wherein the shaft body is a crankshaft of an integral combustion engine for an aircraft, a hydraulic pressure varying unit is mountable upstream of said lead-in oil passage, and a propeller pitch varying unit for varying the pitch of a propeller by hydraulic pressure is mountable downstream of an oil passage formed in the crankshaft.

32. An oil receiver comprising:
- a connecting oil passage, said connecting oil passage being mountable in communication with an inside of a shaft body via a communication hole formed in the shaft body;
- a lead-in oil passage for introducing lubricating oil into said connecting oil passage, said lead-in oil passage extending from said connecting oil passage radially outward; and
- a balance oil passage, said balance oil passage extending from said connecting oil passage radially symmetrically outward on a side of said connecting oil passage opposite to said lead-in oil passage,
- wherein lubricating oil is capable of being introduced from said lead-in oil passage into the inside of the shaft body, and wherein said balance oil passage is closed at an extremity thereof.

* * * * *